United States Patent [19]
Enderle et al.

[11] Patent Number: 4,815,214
[45] Date of Patent: Mar. 28, 1989

[54] PROBE HEAD WITH SELF-CONTAINED ELECTRICAL SWITCH OPERATED MEANS FOR A COORDINATE-MEASURING MACHINE

[75] Inventors: Eckhard Enderle, Aalen-Dewangen; Karl Schepperle, Oberkochen, both of Fed. Rep. of Germany

[73] Assignee: Carl-Zeiss-Stiftung, Oberkochen, Fed. Rep. of Germany

[21] Appl. No.: 72,163

[22] Filed: Jul. 10, 1987

[30] Foreign Application Priority Data

Jul. 12, 1986 [DE] Fed. Rep. of Germany ....... 3623614

[51] Int. Cl.⁴ .................................................. G01B 7/28
[52] U.S. Cl. ....................................... 33/832; 33/558; 33/561; 33/503
[58] Field of Search ............... 33/169 R, 556, 557, 33/558, 559, 560, 561, 503, 504, 1 M; 364/571, 560, 561

[56] References Cited

U.S. PATENT DOCUMENTS

| | | | |
|---|---|---|---|
| 4,136,458 | 1/1979 | Bell et al. | 33/561 |
| 4,153,998 | 5/1979 | McMurtry | 33/559 |
| 4,177,568 | 12/1979 | Werner et al. | 33/561 |
| 4,462,162 | 7/1984 | McMurtry | 33/1 M |
| 4,602,196 | 7/1986 | Matsui | 364/561 |
| 4,637,119 | 1/1987 | Schneider et al. | 33/561 |

FOREIGN PATENT DOCUMENTS

| | | | |
|---|---|---|---|
| DE2347633 | 4/1974 | Fed. Rep. of Germany. | |
| 0030001 | 2/1984 | Japan | 33/169 R |
| 561897 | 5/1975 | Switzerland. | |
| 1095028 | 5/1984 | U.S.S.R. | 33/169 R |
| 1201667 | 12/1985 | U.S.S.R. | 33/169 R |
| WO8603829 | 7/1986 | World Int. Prop. O.. | |

*Primary Examiner*—William A. Cuchlinski, Jr.
*Assistant Examiner*—Patrick R. Scanlon
*Attorney, Agent, or Firm*—Hopgood, Calimafde, Kalil, Blaustein & Judlowe

[57] ABSTRACT

In the work-contacting probe head (or on the suspension of the deflectable work-contacting probe head) of a coordinate measuring machine, an electromagnet is provided to trigger a mechanical impact blow or vibration if the switch-contact circuit in the three-point mounting of the probe pin remains open for a predetermined short period of time after completion of a cycle of coordinate measurement of a given work-contacted measurement location. The delivery of the impact is sufficient to overcome any residual mechanical friction that may have interfered with return of the probe to its calibrated at-rest position, at completion of the measurement cycle.

11 Claims, 4 Drawing Sheets

PROBE HEAD WITH SELF-CONTAINED ELECTRICAL SWITCH OPERATED MEANS FOR A COORDINATE-MEASURING MACHINE

BACKGROUND OF THE INVENTION

The present invention relates to probe-head construction for a coordinate-measuring instrument, wherein the probe head relies on self-contained electrical-switch means, in connection with assuring positioned reference for each measurement, and for other measuring purposes. Such probe heads are described, for example, in Federal Republic of Germany Pat. Nos. 2,347,633 and 2,712,181, and in Federal Republic of Germany OS No. 2,743,665; the corresponding U.S. patents for these German cases are U.S. Pat. Nos. 4,177,568, 4,153,998, and 4,136,458, respectively. In the known electrically switching probe heads, the mounting or seating location from which the probe pin lifts off, upon workpiece contact in the course of the probing process, is generally an isostatic three-point mounting formed of, e.g., paired balls; the paired balls of all three mounting points are connected as contact pairs in an electric ciccuit which is closed only when three electrically conductive mating members on the probe pin are fully seated against the respective ball pairs, to close all three switches and thus to electrically certify the at-rest position of the probe pin. The switching-contact feature is needed, for example, to supply machine-control means of the coordinatemeasuring instrument with trigger pulses for storing of length-measurement values at the time of work-contact. Furthermore, this switch-contact feature is used to report whether the probe pin has again returned to its seated reference position after completing each work-contacting procedure, it being understood that such seating determines the calibrated-zero position of the work-contact ball and therefore establishes that the probe head is ready for the next measurement.

It has now been found that, with an error frequency of about once every several thousand work-contact cycles, all three switch-contacts do not close upon termination of a work-contacting cycle. This error does not have any systematic cause but occurs due to the fact that the probe pin does not return entirely and precisely into its zero position, due to residual mechanical friction in its threepoint mounting. This frequency of error is, to be sure, very small, but in certain types of coordinate-measuring instrument operation, this error, i.e., a switch contact remaining open after a work-contact, has serious consequences.

Coordinate-measuring instruments are being used to an increasing extent in multiple-measurement operations and measure, for example during an unmanned night shift under CNC control (i.e., without attendants or operating personnel), a large number of workpieces which are clamped on a measurement table or fed continuously via a handling system. If such an error occurs in this type of operation, then the machine control stops the CNC operation for reasons of safety, and the coordinate-measuring instrument remains shut down until the beginning of the following shift, at which time the error can be noted and manually eliminated. It is clear that such interruptions in operation are extremely undesirable.

BRIEF STATEMENT OF THE INVENTION

The object of the present invention is reliably to assure closure of all switch contacts in the probe head of a coordinate measuring instrument, even in unattended, fully automatic operation of the instrument.

The invention achieves this object by providing, within the probe head or on the suspension for the probe head, means for delivering a mechanical-impact blow which can be triggered when the control system for a coordinate-measuring machine detects the occurrence of failure of switch-contact closure upon completion of a given measurement cycle, thus signifying failure of the probe to return to its zero-calibration or reference position. The mechanical-impact blow is sufficient to jar the probe-pin holder out of staticfriction retention of an erroneous at-rest position, allowing probe-head seating to complete the closure of all three switches.

The device for producing the impact blow can, for example, be developed as an electromagnet, an imbalance motor, electrically or pneumatically prestressed springs or a piezoelectric oscillator. In all cases, the closing of the switch contact takes place with the help of mechanical shock overcomes residual friction in the mounting of the probe pin. This energy blow is triggered, for example, by the machine-control means when all switch-closures have not been accomplished within a predeterminable period of time after the completion of the work-contacting cycle.

The the use of such a device, the reliability of coordinate measuring instruments in an automated series of operations can be substantially increased at relatively little expense. The expense necessary to obtain this result is particularly small for the case of probe heads which are already provided with an electromagnetic probe-pin changing device as described, for example, in European Pat. No. A2,128,464. In this case, the electromagnet which is relied upon to clamp a replacement probe pin the the probe-pin holder, and which is in any event already installed in the probe head, can be used to automatically produce the desired mechanical energy blow.

However, the device for producing the energy blow need not necessarily be installed directly in the probe head. It can, for example, also be arranged on the coordinate measuring instrument in the vicinity of the suspension or the mount for the probe head, since the mechanical blow is transmitted via mounting elements directly to the probe head. The work-contacting probe support is frequently developed as a disengageable mount in order, for example, to provide collision protection for the probe head. After a collision, the position of the probe head must be reproduced with high precision in order to avoid a recalibration of the probe-pin combination, and therefore the present invention offers the possibility of activating the mechanical-impact device after a contact-probe collision, as a result of which the contactprobe mount is "shaken" into its exact zero position by one or by several impacting blows.

In an advantageous use of the invention, the machinecontrol system of the coordinate measuring instrument contains a control module hwich, in the event of an erroneously open switch condition, interrupts the course of the measurement and moves the probe head back to the location of the most recently worked measurement cycle.

By this measure, the probe pin is again deflected at the most recent measurement location. Since there is only very small probability of the contact again remaining open during the course of this repeated measurement cycle, the error which has occurred may also be dependably eliminated by this procedure. The advantage of this solution resides in the fact that no change need to effected at the probe head itself or in its suspension and, furthermore, no electromagnetic probe-change device need to involved. Rather, the necessary measures are limited to an intervention in the electronic control system of the coordinate measuring instrument.

Although mention thus far has been made only in application to a coordinate measuring instrument, it is clear that the invention also has important application to a machine tool wherein a tool holder is automatically loaded with a probe head, in temporary replacement of a machining tool, for immediate measurement of the result of a given machining operation upon the workpiece; in this situation, the machine tool also operates as a measuring instrument.

DETAILED DESCRIPTION

The invention will be illustratively described in detail, in conjunction with the accompanying drawings, in which.

Figure 1:
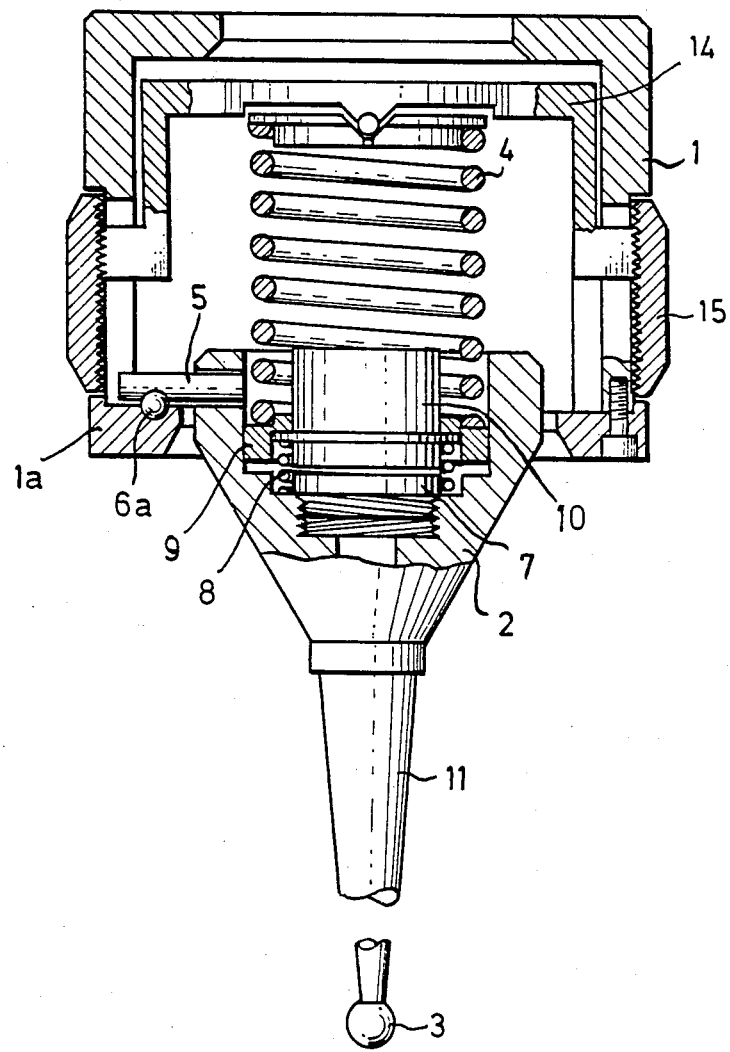
FIG. 1 is a view in elevation of a probe head of electrical-switch tyhpe with means for producing a mechanical impact blow, the view being partly broken-away and in longitudinal section.

The probe head of FIG. 1 comprises a cylindrical housing 1 having at its lower end an annular collar 1a which mounts three pairs of balls, at 120.° spacing between pairs. In the sectioned portion of FIG. 1, only one ball (6a) is visible. The three pairs of balls form the mounting or seat into which a probe-pin holder 2 having three radially protruding cylindrical members 5 is urged by a spring 4. The probe pin itself is designated 11 and is shown with a work-contacting probe-tip ball 3. Spring 4 rests via a pressure plate and a ball against an abutment 14 which is axially displaceable via an adjustment ring 15 which extends around the housing 1. Contact force of the probe pin 11 can be adjusted by means of ring 15.

Figure 2:
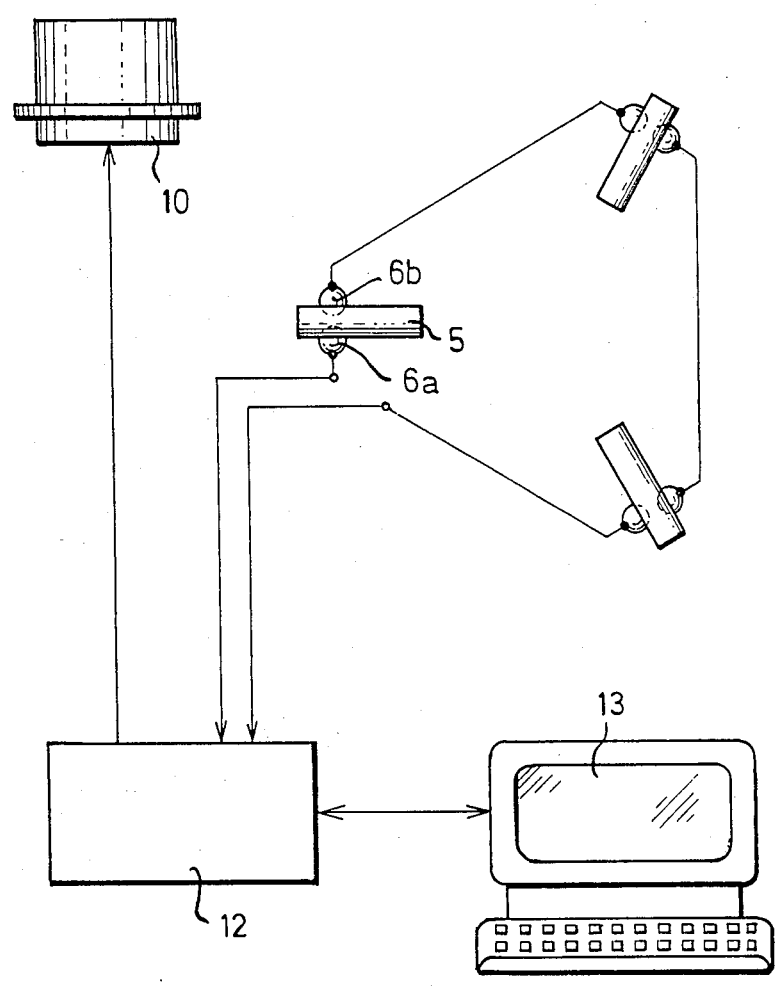
FIGS. 2 is a diagram schematically showing components for controlling the impact means of FIG. 1.

As can be noted from FIG. 2, the three pairs of mounting balls 6 are electrically connected to one another and form contacts which are closed by the cylindrical members 5 of the probe-pin holder 2 in the at-rest position of probe pin 11.

Fixedly seated within the probe-pin holder 2, a soft-iron plate 7 (i.e., of low magnetic retentivity) faces a movable electromagnet 10; magnet 10 is urged by a second spring 8 against a stop ring 9 in such manner that a small air gap is produced between the magnet 10 and the soft-iron plate member 7.

The three switch contacts formed by the respective pairs of mounting balls 6 and the electromagnet 10 are separately connected to a control module 12 which may be a programmable "firmware" unit, interfacing the switch contacts and the electromagnet with a computer 13 associated with a coordinatemeasuring instrument (not shown). This control module 12 has the task, among other things, of transmitting to the computer 13 coordinates measured in the course of scanning displacements of the measuring machine and of reporting such malfunctioning errors as, for example, open contacts; and, in turn, control module 12 receives, from computer 13, control data for the measurement program to be executed.

The control module 12 will be understood to include a microprocessor so programmed that in the absence of closing all three switch contacts for a predetermined period of time, it briefly excites the electromagnet 10. In this connection, the electromagnet 10 strikes against the soft-iron member 7 and produces a mechanical-impact blow by means of which a contact which has remained open as a result of static friction is jarred into closure of the circuit formed by the balls 6 and the cylindrical members 5. Accordingly, the indicated staticfriction malfunction is eliminated; no error is reported by the computer 13, and a CNC operation can be permitted to continue.

Figure 1A:
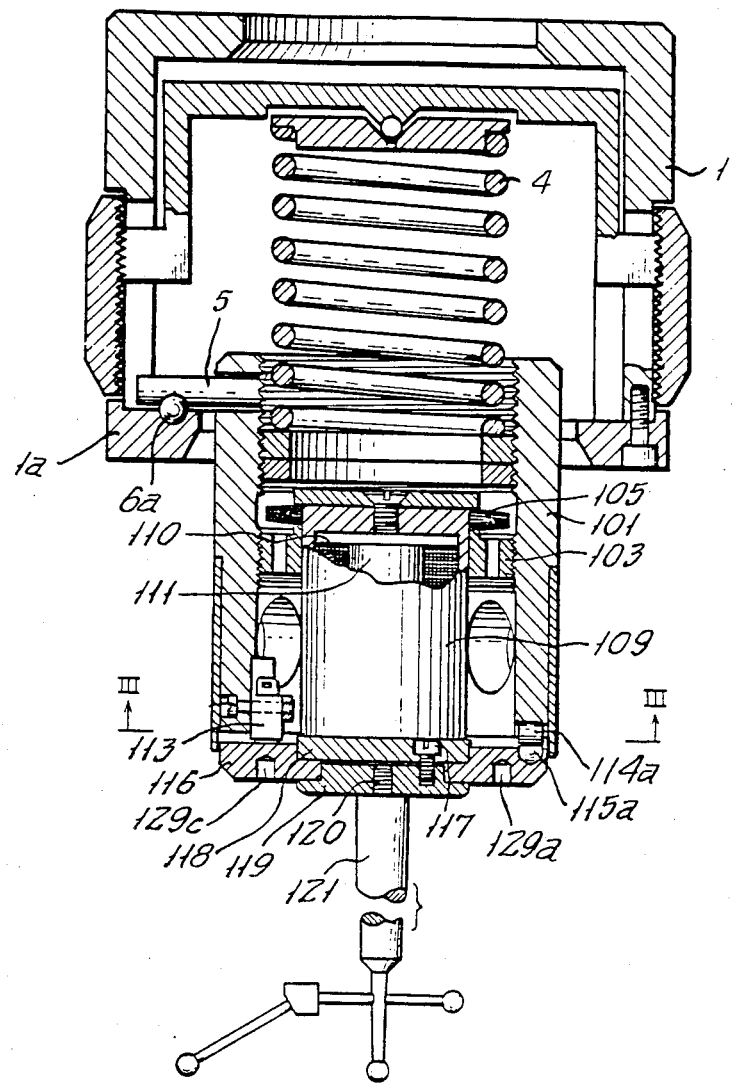
FIG. 1a is a simplified view in longitudinal section, to illustrate the invention in application to a probe-pin head having provision for interchangeable accommodation of different probe pins.

FIG. 1a shows application of the invention to a probe head having the probe-pin change feature of FIG. 1 of U.S. Pat. No. 4,637,119, to which reference is made for detailed description. It suffices here to identify the electromagnet of said patent and to state that, for convenience, significant reference numbers used in FIG. 1 of said patent are shown in 100-series notation in FIG. 1a herein; Thus, the electromagnet of FIG. 1 of said U.S. patent is identified 110 herein. In said patent, the electromagnet (110 herein) serves for probe-pin changing purposes, by so arranging and exciting the same as to selectively neutralize the field of a permanent magnet 111. The permanent magnet, via a steel armature plate 118, normally retains the probe pin in assembled relation to the probe-pin holder (116 to 121); but upon excitation of the electromagnet 110, the permanent-magnet field is neutralized, thus enabling the probe pin to be released.

In application of the invention to the changeable probepin holder of FIG. 1a, the electromagnet 110 is so controlled via its connection to control module 12 that to deliver the impact necessary to overcome static friction and thus close all pairs of switch contacts, the control module 12 is programmed to deliver to electromagnet 110 a polarized probe-pin releasing voltage pulse of only a few milliseconds duration, followed immediately by a pulse of opposite polarity, to aid the field of the permanent magnet and thus to attract the armature of the magnet. Due to its inertia, the probe pin responds to such a transient excitation of the electromagnet 10, by dropping only a fiew micrometers away from its mounting in the probe head, and the vibrational shock of the renewed clamping is sufficient to overcome the static-friction problem and to reset the switch-contact pairs for fully seated closure, thus eliminating the reported malfunction of incompleted switch closure.

Tests carried out with an interchangeable-probe device according to the embodiment of FIG. 1a were interrupted after $10^6$ error-free work-contacting procedural cycles, since there was no occurrence of a switch contact remaining open after the described automatic instigation of the short jarring-impact cycle.

Figure 3:
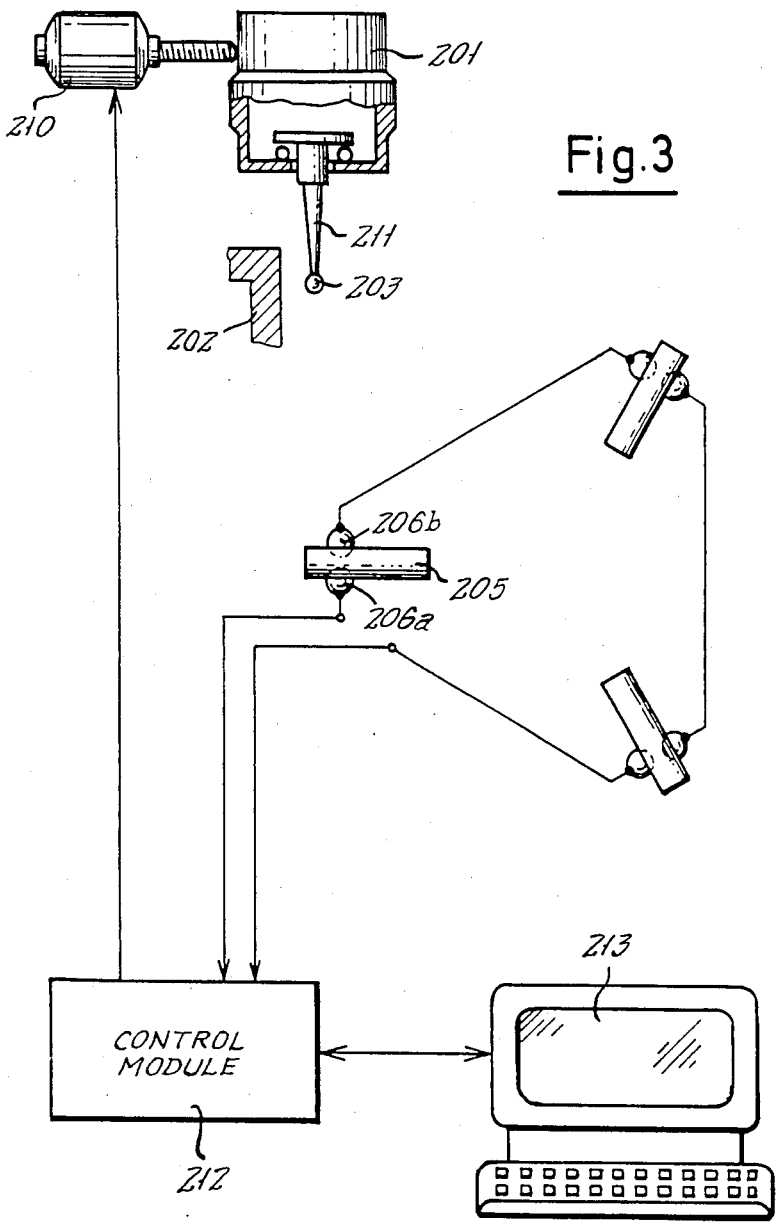
FIG. 3 is a similar diagram for another embodiment.

In the embodiment of FIG. 3, machine control of the coordinate-measuring instrument will be understood to include a control module 212 connected to the switch-contact pairs 205/206 in a probe head 201, wherein the microprocessor of control module 212 is so programmed that the measurement program transmitted by the associated computer 213 is interrupted only upon the absence of the switch contact. The probe head 201 is then retracted, via machine-displacement drive means 210, under control by module 212, to the most-recent prior position of contact with the workpiece 202. In this connection, another deflection of the probe pin 211 occurs, so that, upon retracing the machine displacement, all three switch contacts close with a very high degree of probability, and the error is eliminated.

What is claimed is:

1. In combination, a coordinate-measuring instrument having electronic control means and a work-contacting probe head with means for deflectably supporting a probe pin for deflection upon contact with a workpiece, electrical-switch means associated with said supporting means for assurance of positional reference for each measurement, a mechanical-impact device associated with said probe head and circuit means including said switch means and said control means for actuating said mechanical-impact device in the event of an erroneously open condition of said switch means.

2. A coordinate-measuring instrument having control means and a work-contacting probe head with electrical-switch means for assurance of positional reference for each measurement in a course of workcontacting measurements, said control means including means for producing a cycle of machine displacement involving advance of said probe head into and retraction of said probe head out of work-contacting relation for each measurement, and circuit means including said switch means and said control means for repeating said cycle in the event of an erroneously open condition of said switch means.

3. In a coordinate-measuring instrument wherein a probe head has a electrical-switch means for assurance of at-rest positional reference for a probe pin that is deflectably mounted to the probe head, and wherein a path of probe-head displacement is computer-controlled to accomplish a predetermined succession of probe-head advances to successive positions from each of which the probe pin is to be subjected to a measurement cycle of displacement into and retraction from the involved location of workpiece contact, the improvement wherein means responsive to a failure of said electricalswitch means at a particular measurement location to assure return of the probe pin to its at-rest reference position is operative to subject the probe head to a transient mechanical shock, thereby materially enhancing the chance of electrical-switch assurance of probe-pin return to the at-rest reference position.

4. The improvement of claim 3, in which the probe head includes an electromagnet which is transiently excited to develop the mechanical shock.

5. The improvement of claim 3, wherein said instrument includes means including an electromagnet component for selective release of the probe pin from the probe head, and wherein said electromagnet is transiently excited to develop the mechanical shock.

6. As an article of manufacture, a probe head with means for deflectably supporting a probe pin for deflection upon contact with a workpiece, electricalswitch means associated with said deflectable-support means for assurance of a single at-rest position of reference for the probe pin with respect to the probe head, and electrically operable means carried by the probe head for imparting a transient mechanical shock to said supporting means in the detected event of failure of said switch means to assure probe-pin return to the at-rest position following a deflection of said probe pin.

7. The article of claim 6, in which said electrically operable means includes an electromagnet.

8. The article of claim 6, in which said electrically operable means comprises an electromagnet with a movable armature.

9. The article of claim 6, in which said electrically operable means includes firmware connected to said switch means and responsive to said failure event to activate means for imparting the transient mechanical shock to said supporting means.

10. The article of claim 6, wherein an electromagnet is a component of means for selective release of the probe pin from the probe head, and wherein said electrically operable means includes said electromagnet.

11. The article of claim 6, in which the at-rest position is determined by concurrent closure of electricalswitch contacts at each of three equally spaced locations of probe-pin supporting engagement with said probe head.

* * * * *